United States Patent
McCue et al.

(10) Patent No.: US 11,072,510 B2
(45) Date of Patent: Jul. 27, 2021

(54) PRINT SHOES

(71) Applicant: Hewlett-Packard Development Company, L.P., Spring, TX (US)

(72) Inventors: Tom McCue, Vancouver, WA (US); Lonny Morgan, Vancouver, WA (US); Catherine Elizabeth Gould, Vancouver, WA (US); Anthony W Ebersole, Vancouver, WA (US); Robert Yraceburu, Vancouver, WA (US); Elliott Downing, Vancouver, WA (US); Robert Scott Beale, Vancouver, WA (US); Bruce G Johnson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/645,039

(22) PCT Filed: Sep. 14, 2017

(86) PCT No.: PCT/US2017/051590
§ 371 (c)(1),
(2) Date: Mar. 6, 2020

(87) PCT Pub. No.: WO2019/055019
PCT Pub. Date: Mar. 21, 2019

(65) Prior Publication Data
US 2021/0122600 A1 Apr. 29, 2021

(51) Int. Cl.
*B65H 31/36* (2006.01)
*B65H 31/30* (2006.01)

(52) U.S. Cl.
CPC ......... *B65H 31/3081* (2013.01); *B65H 31/36* (2013.01); *B65H 2601/521* (2013.01); *B65H 2601/524* (2013.01); *B65H 2801/27* (2013.01)

(58) Field of Classification Search
CPC ............. F16F 15/067; B65H 2601/521; B65H 2601/524; B65H 2801/27
See application file for complete search history.

(56) References Cited

U.S. PATENT DOCUMENTS

| | | |
|---|---|---|
| 4,589,652 A | 5/1986 | Silverberg |
| 6,032,552 A | 3/2000 | Alleai |
| 6,905,118 B2 | 6/2005 | Yamada et al. |
| 7,120,383 B2 | 10/2006 | Sato et al. |
| 8,028,984 B2 | 10/2011 | Taki et al. |
| 8,254,819 B2 | 8/2012 | Okamoto |
| 8,286,958 B2 | 10/2012 | Suzuki et al. |
| 9,624,061 B2 | 4/2017 | Matsushita et al. |

FOREIGN PATENT DOCUMENTS

JP 2001139214 A 5/2001

*Primary Examiner* — Leslie A Nicholson, III
(74) *Attorney, Agent, or Firm* — Brooks Cameron & Huebsch PLLP

(57) ABSTRACT

Example described herein relate to a print shoes. For instance, a print shoe can include a body including a first surface, a first arm extending from the first surface and including a first mounting mechanism to couple to a spring, and a second arm extending from the first surface in a position substantially coplanar with the first arm, where the second arm includes a second mounting mechanism to couple to the spring and dispose the first arm a distance away from the second arm when coupled to the spring.

13 Claims, 8 Drawing Sheets

PRINT SHOES

BACKGROUND

Imaging systems, such as printers, may allow text or images to be printed onto print media (e.g., paper, plastic, etc.). Imaging systems, generally include a stacking region for the collection of print media. The stacking region may be an output region where a user may receive the print media. In some examples, imaging systems may be provided with a finisher where the print media may be collected for a finishing process, such as stapling, three-hole punching, etc. In this regard, the stacking may be within the imaging system where the print media are collected for post processing.

DETAILED DESCRIPTION

Figure 1:
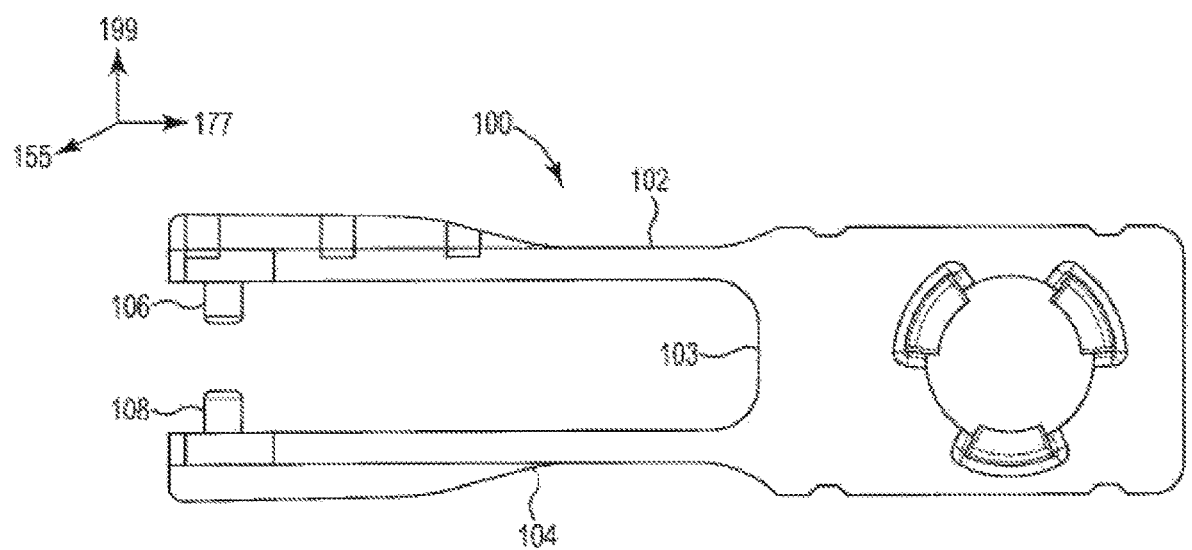
FIG. 1 illustrates an example of a print shoe consistent with the disclosure.

Print shoes and systems are described herein. In various examples, print shoe can include a body including a first surface, including: a first arm extending from the first surface and including a first mounting mechanism to couple to a spring; and a second arm extending from the first surface in a position substantially coplanar with the first arm, where the second arm can include a second mounting mechanism to couple to the spring and dispose the first arm a distance away from the second arm when coupled to the spring. The print shoe described herein can be positioned in a channel system within a finisher. Desirably, the print shoe described herein can be utilized to reduce or eliminate the amount of noise and/or vibration produced by the finisher. As used herein, a print shoe refers to a structure to be disposed in a channel system as described herein.

As described above, in some examples, print media may be collected for a finishing process, such as stapling, three-hole punching, etc. Finishing is a term used for post processing of print media. In some examples, the finisher can include a translator mounted to the finisher, a channel system that the translator mounts to, and a print shoe that sits inside the channel system. In some examples, the translator can be an advancement mechanism to transport print media for the finishing process. In various examples, the translator may include rollers, puller clamps and/or media guides which translate to move the print media from an output of an imaging portion, for example, into the post processing region. In some examples, the channel system assists the translator in moving print media through the finisher during the finishing process. In some examples, the print shoe sits inside the channel system and fills the entire height of the channel system providing acoustic benefits.

Accordingly, the disclosure describes system and methods to provide an acoustic benefit to the channel system in the finisher. Various examples described herein describe a print shoe with mounting mechanisms to couple to a spring.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

FIG. 1 illustrates an example of a print shoe 100 consistent with the disclosure. The system 100 may be implemented in a variety of imaging systems, such as printers or copiers, for example. In some examples, the system 100 can be implemented in the finisher of an imaging system. In various examples, the system 100 can include a first surface 103 (i.e., a front surface or a front side). The first surface 103 can include a first arm 102 extending from the first surface 103 and a second arm 104 extending from the first surface 103. As illustrated in FIG. 1, the first arm 102 can extend from a different portion of the first surface 103 than a portion of the first surface 103 from which the second arm 104 extends. However, the disclosure is not so limited. The first arm 102 and the second arm 104 can, in some examples, extend from a common portion of the first surface 103.

In various examples, the second arm 104 can be substantially coplanar with the first arm 102. As used herein, being substantially coplanar refers to being on (in terms of degree) the same or similar plane but being spaced apart from the other arm. Moreover, while each of the first arm 102 and the second arm 104 are illustrated as extending primarily in a given direction it is understood that the first arm 102 and/or the second arm 104 can be curved or have different shapes/geometry than that of the first arm 102 and/or the second arm 104 illustrated in FIG. 1.

In some examples, the first arm 102 can be comprised of bearing material formed of metal, plastic, a combination thereof, or any material that gives a desired flexibility. In some examples, the first arm 102 can be flexible or malleable to promote readily controlling the first arm 102. For example, the first arm 102 can be dispositioned against a channel system so that the connection between the first arm 102 and a channel system is constant and secure to mitigate or eliminate vibration and resultant noise of the shoe in the channel system, as described herein with greater detail with respect to FIG. 7.

In some examples, the second arm 104 can be comprised of bearing material formed of metal, plastic, a combination thereof, or any material that gives the desired flexibility. In some examples, the second arm 104 can be flexible or malleable. For example, the second arm 104 can be disposed against a channel system so that the connection between the second arm 104 and a channel system to mitigate or eliminate vibration and resultant noise of the shoe in the channel system.

As illustrated in FIG. 1, the first arm 102 can include mounting mechanism 106. Mounting mechanism 106 refers to a mechanism to couple to a spring or other device that is capable of controlling the force between the first arm 102 and the second arm 104. As detailed herein, examples of mounting mechanisms include protrusions, recesses, among other types of mechanical structures to couple to a spring. Similarly, the second arm 104 can include mounting mechanism 108. Mounting mechanism 108 refers to a mechanism to couple a spring or any device capable of controlling the force between the first arm 102 and the second arm 104.

In some examples, mounting mechanism 106 can be a recess or other cavity within the first arm 102. In some examples mounting mechanism 106 can be a protrusion that extends from the first arm 102, for instance, extending in a direction towards the second arm 104. As illustrated in FIG. 1, the mounting mechanism 106 and the mounting mechanism 108 can be protrusions; however, it is understood that a type of the mounting mechanism 106 and/or a type of the mounting mechanism 108 can be varied.

In some examples, the mounting mechanism 106 can be positioned substantially at the distal end of the first arm 102. As used herein, substantially distal end means within twenty-five percent of the end furthest away from the first surface 103. In some examples, the mounting mechanism 106 can be positioned in the centermost portion of the first arm 102. As used herein, the centermost portion refers to being substantially at a centerpoint of an object such as the first arm 102.

In some examples, mounting mechanism 108 can be a recess or other cavity within the second arm 104. In some examples, mounting mechanism 108 can be a protrusion that extends from the second arm 104 in a direction towards the first arm 102. In some examples, the mounting mechanism 108 can be positioned substantially at the distal end of the second arm 104. In some examples, the mounting mechanism 108 can be positioned in the centermost portion of the second arm 104. However, it is understood that a location of the mounting mechanism 106 and/or the mounting mechanism 108 can be varied and disposed anywhere along a length (along axis 177) of the first arm and/or the second arm, respectively, among other possibilities.

Figure 2:
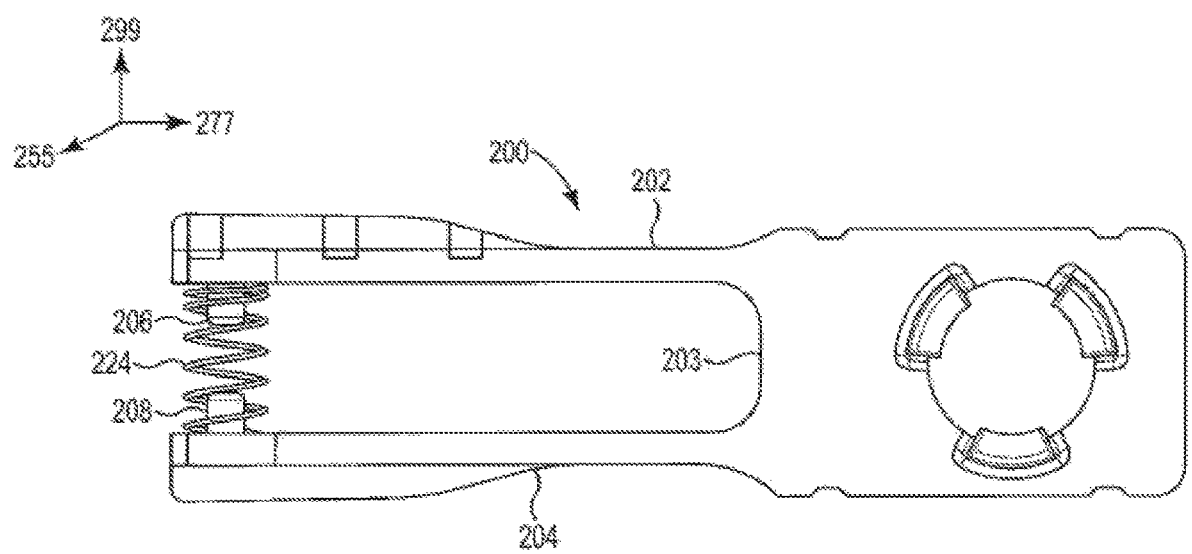
FIG. 2 illustrates an example of a print shoe consistent with the disclosure.

FIG. 2 illustrates an example of a print shoe 200 consistent with the disclosure. In some examples, the system 200 can be implemented in a finisher of an imaging system. In various examples, the system 200 can include a first surface 203. In some examples, the first surface 203 can include a first arm 202 extending from the first surface 203 and a second arm 204 extending from the first surface 203. As mentioned, the second arm 204 can be substantially coplanar with the first arm 202.

As illustrated in FIG. 2, the first arm 202 can include mounting mechanism 206. Mounting mechanism 206 refers to a mechanism to couple a spring or any device capable of controlling the force between the first arm 202 and the second arm 204. Similarly, the second arm 204 can include mounting mechanism 208. Mounting mechanism 208 refers to a mechanism to couple a spring or any device capable of controlling the force between the first arm 202 and the second arm 204. The mounting mechanisms 206 and 208 can be coupled to a spring 224 to dispose the first arm 202 away from the second arm 204.

In some examples, the spring 224 ensures there is at least a portion of distance between the first arm 202 and the second arm 204 to mitigate or eliminate vibration of the print shoe 200, as it moves along a channel system. The examples described herein depict a spring 224, however, the mounting mechanisms 206 and 208 can be mounted to any device capable of controlling the force between the first arm 202 and the second arm 204.

Figure 3:
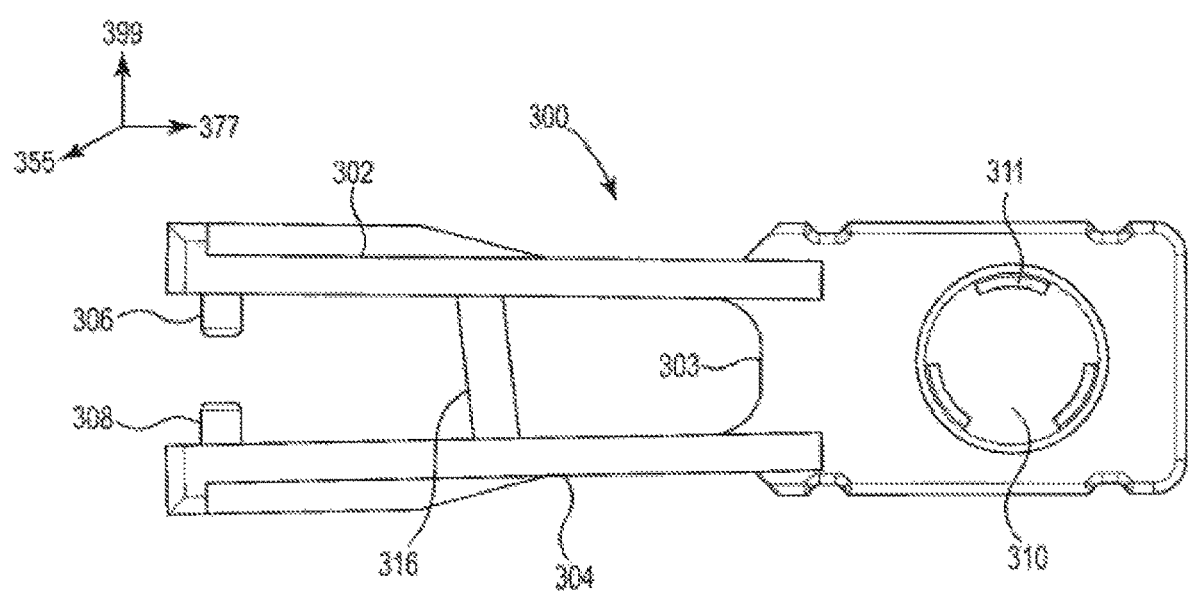
FIG. 3 illustrates an example of a print shoe consistent with the disclosure.

FIG. 3 illustrates an example of a print shoe 300 consistent with the disclosure. In some examples, the system 300 can be implemented in a finisher of an imaging system. In various examples, the system 300 can include a first surface 303. In some examples, the first surface 303 can include a first arm 302 extending from the first surface 303 and a second arm 304 extending from the first surface 303. The second arm 304 can be substantially coplanar with the first arm 302.

In some examples, a third arm 316 that can extend from the first arm 302 to the second arm 304 or from the second arm 304 to the first arm 302. In some examples, the third arm 316 can be curved or straight extending from the first arm 302 towards the second arm 304 and not touching the second arm 304. In some examples, the third arm 316 can be curved or straight extending from the second arm 304 towards the first arm 302 and not touching the first arm 302. In some examples, the third arm 316 can be positioned to ensure at least a portion of distance between the first arm 302 and the second arm 304. In some examples, the third arm 316 can be positioned to ensure the portion of distance between the first arm 302 and the second arm 304 do not exceed a set distance. The third arm can be positioned in any location between the mounting mechanisms 306 and 308 and the first surface 303.

As illustrated in FIG. 3, the first arm 302 can include mounting mechanism 306. Mounting mechanism 306 refers to a mechanism to couple a spring or any device capable of controlling the force between the first arm 302 and the second arm 304. Similarly, the second arm 304 can include mounting mechanism 308. Mounting mechanism 308 refers to a mechanism to couple a spring or any device capable of controlling the force between the first arm 302 and the second arm 304, In some examples, the system 300 can include an opening 310 to receive a translator and a plurality of mounting mechanisms 311 to hold the translator in place.

Figure 4:
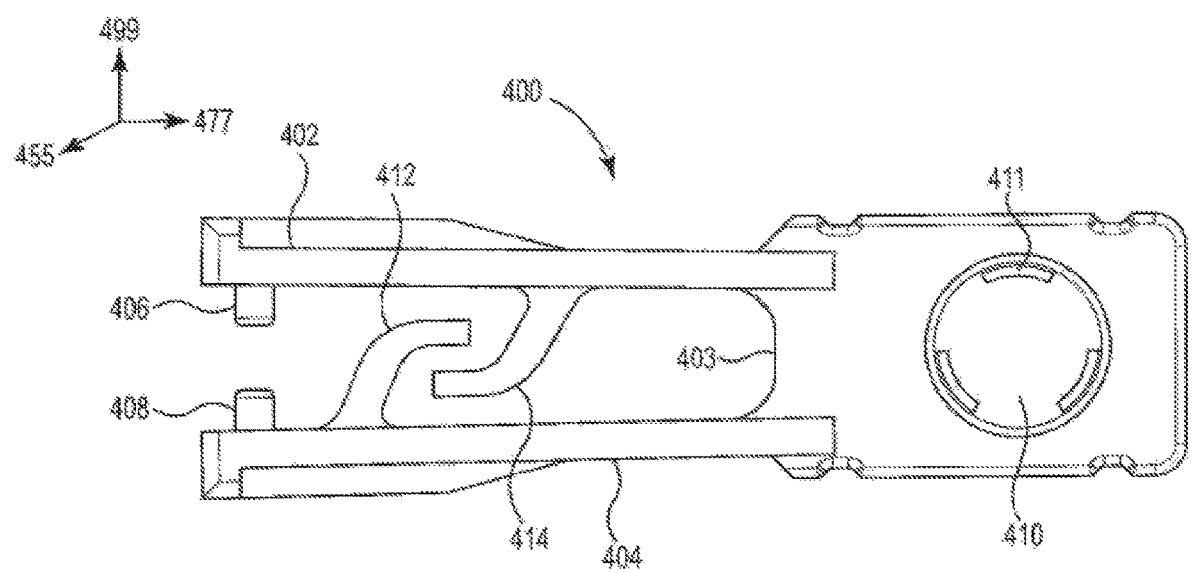
FIG. 4 illustrates an example of a print shoe consistent with the disclosure.

FIG. 4 illustrates an example of a print shoe 400 consistent with the disclosure. In some examples, the system 400 can be implemented in a finisher of an imaging system. In various examples, the system 400 can include a first surface 403. In some examples, the first surface 403 can include a first arm 402 extending from the first surface 403 and a second arm 404 extending from the first surface 403. The second arm 404 can be substantially coplanar with the first arm 402.

As illustrated in FIG. 4, a third arm 412 can extend from the first arm 402 or second arm 404 in a direction towards the other of the first arm 402 or second arm 404. In some examples, the third arm 412 can be curved. Similarly, the fourth arm 414 can extend from the first arm 402 or second arm 404 that is opposite the second arm 404 or first arm 402 including the third arm 412. In some examples, the fourth arm 414 can be curved.

In some examples, the curved portion of the fourth arm 414 can contact the curved portion of the third arm 412 to ensure the portion of distance between the first arm 402 and the second arm 404 do not exceed a set distance. In some examples, the curved portion of the fourth arm 414 can contact the second arm 404 and/or the third arm 412. For instance, the fourth arm 414 can contact the second arm 404 to ensure the portion of distance between the first arm 402 and the second arm 404 is maintained and/or contact the third arm to ensure a distance between the first arm and the second arm does not exceed a threshold distance (i.e., so that the first arm 402 is not distanced further than desired from the second arm 404, particularly when the print shoe is not disposed in a channel system). Similarly, in some examples, the curved portion of the third arm 412 can contact the first arm 402 and/or the fourth arm 414. In some examples, the third arm 412 can be straight, extending from the first arm 402 or second arm 404 in a direction towards the other of the first arm 402 or second arm 404. In some examples, the fourth arm 414 can be straight, extending from the first arm 402 or second arm 404 that is opposite the second arm 404 or first arm 402 including the third arm 412. In some examples, the fourth arm 414 can contact the third arm 412 to ensure a portion of distance between the first arm 402 and the second arm 404 is maintained.

Referring to FIG. 4, the first arm 402 can include mounting mechanism 406. Mounting mechanism 406 refers to a mechanism to couple a spring or any device capable of controlling the force between the first arm 402 and the second arm 404. The second arm 404 can include mounting mechanism 408. Mounting mechanism 408 refers to a mechanism to couple a spring or any device capable of controlling the force between the first arm 402 and the second arm 404. In some examples, the system 400, can include an opening 410 to receive a translator and a plurality of mounting mechanisms 411 to hold the translator in place.

Figure 5:
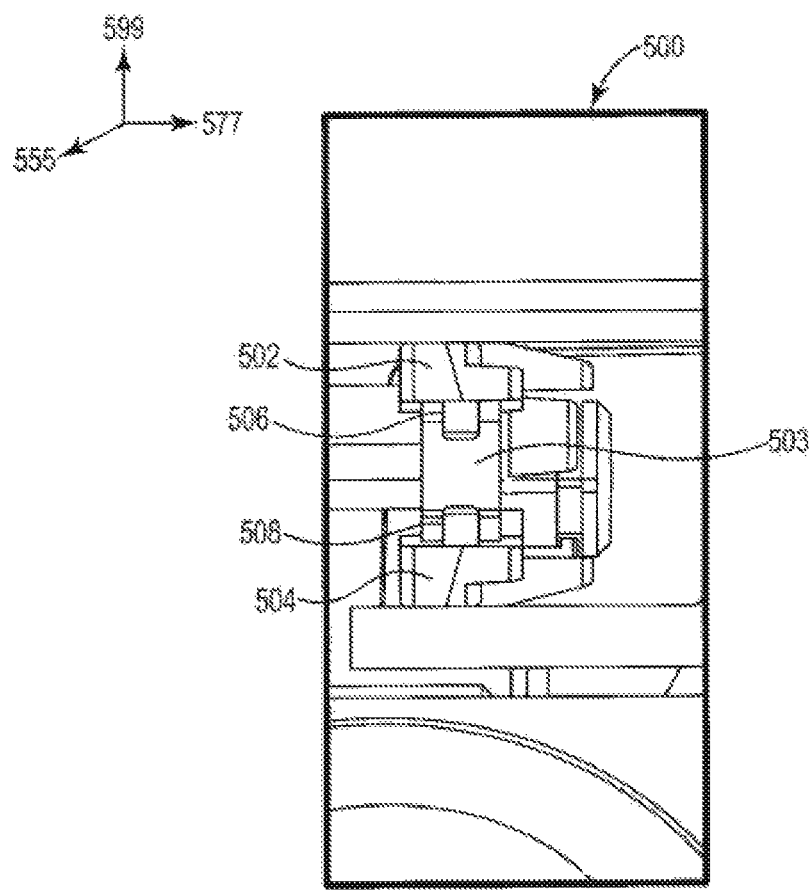
FIG. 5 illustrates a front view of an example of a print shoe consistent with the disclosure.

FIG. 5 illustrates a front view of an example of a print shoe 500 consistent with the disclosure. In some examples, the system 500 can be implemented in a finisher of an imaging system. In various examples, the system 500 can include a first surface 503. In some examples, the first surface 503 can include a first arm 502 extending from the first surface 503 and a second arm 504 extending from the first surface 503. The second arm 504 can be substantially coplanar with the first arm 502.

As illustrated in FIG. 5, the first arm 502 can include mounting mechanism 506. Mounting mechanism 506 refers to a mechanism to couple a spring or any device capable of controlling the force between the first arm 502 and the second arm 504. Similarly, the second arm 504 can include mounting mechanism 508. Mounting mechanism 508 refers to a mechanism to couple a spring or any device capable of controlling the force between the first arm 502 and the second arm 504.

Figure 6:
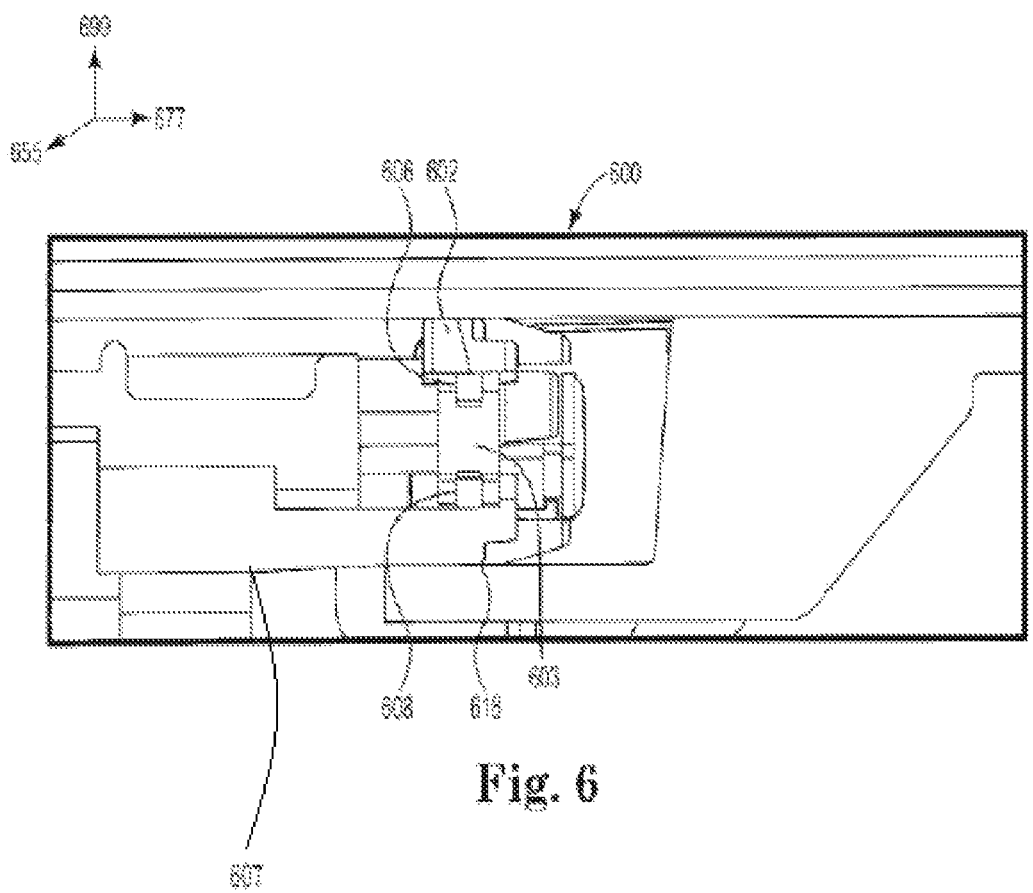
FIG. 6 illustrates a front view of an example of a print shoe consistent with the disclosure.

FIG. 6 illustrates a front view of an example of a print shoe 600 consistent with the disclosure. In various examples, the system 600 can include a first surface 603. In some examples, the first surface 603 can include a first arm 602 extending from the first surface 603. The second arm 618 extends from a translator 607 into the channel system. The second arm 618 can be substantially coplanar with the first arm 602. Moreover, while the second arm 618 is illustrated as extending primarily from a particular portion of the translator 607 it is understood that the second arm 618 can extend from a different particular point portion of the translator 607.

As illustrated in FIG. 6, the first arm 602 can include mounting mechanism 606, Mounting mechanism 606 refers to a mechanism to couple a spring or any device capable of controlling the force between the first arm 602 and the second arm 618. Similarly, the second arm 618 can include mounting mechanism 608, Mounting mechanism 608 refers to a mechanism to couple a spring or any device capable of controlling the force between the first arm 602 and the second arm 618.

Figure 7:
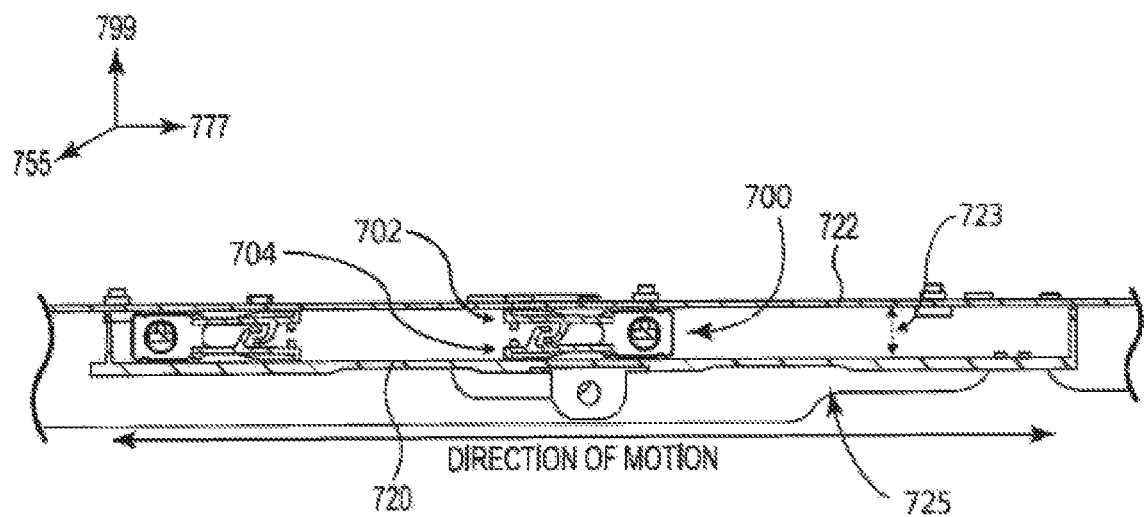
FIG. 7 illustrates a cross sectional view of an example of a print shoe in a channel system consistent with the disclosure.

FIG. 7 illustrates a cross sectional view of an example of a print shoe 700 in a channel system 723 consistent with the disclosure. In some examples, the system 725 can include a channel system 723 that has a first channel surface 722 that is along the 777 axis and a second channel surface 720 that can be substantially coplanar with the first channel surface 722. In some examples, the system 725 can include a channel system 723 that has a first channel surface 722 and a second channel surface 720 that can be parallel with the first channel surface 722. In some examples, a print shoe 700 can be positioned between the first channel surface 722 and the second channel surface 720. In some examples, the first channel surface 722 can be adjacent to (along axis 777) the first arm 702 or the second arm 704 of print shoe 700. The first arm 702 or second arm 704 can be dispositioned against the first channel surface 722 to reduce vibration and resultant noise. In some examples, the second channel surface 720 can be adjacent to (along axis 777) the second arm 704 or first arm 702 of print shoe 700. The second arm 704 or first arm 702 can be dispositioned against the second channel surface 720 to reduce vibration and resultant noise.

As illustrated in FIG. 7, the print shoe 700 of system 725 can move in a lateral motion inside of the channel system 723 in a direction that moves along the 777 axis. The disposition of the first arm 702 and the second arm 704 against the channel system 723 can cause the print shoe 700 to stay securely inside the channel system 723 during the lateral motion. It is understood that the print shoe in FIG. 7 can be any print shoe consistent with the disclosure.

Figure 8:
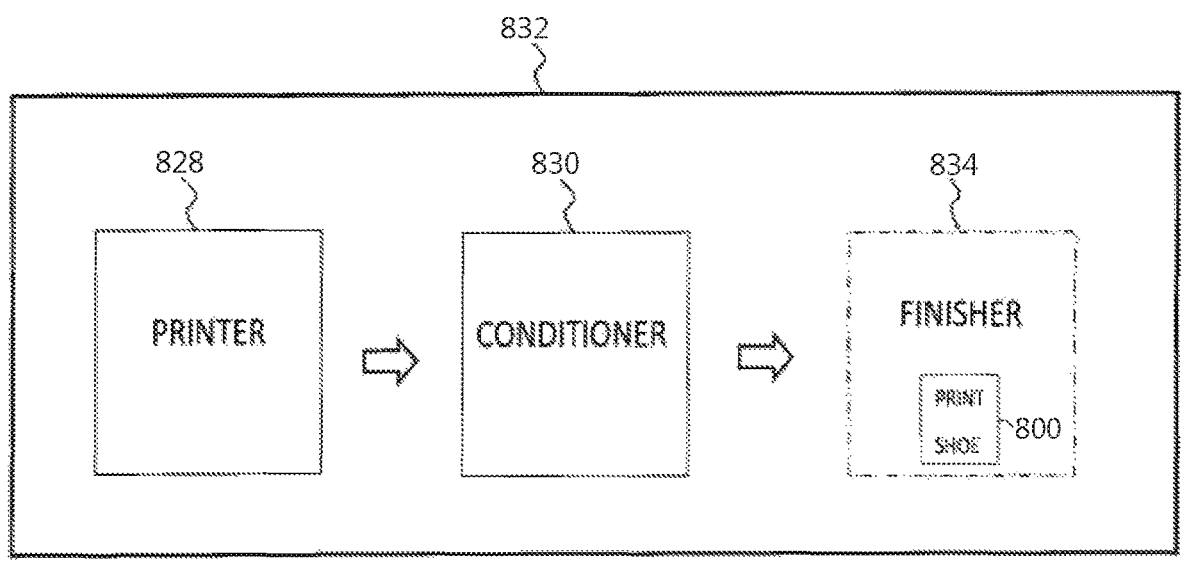
FIG. 8 is a schematic illustration of an example of a system including a print shoe consistent with the disclosure.

FIG. 8 is a schematic illustration of an example of a system including a print shoe 800 consistent with the disclosure. In some examples, the system 832 can include a printer 828 that can generate print media. The printer 828 can be any printer that can deposit printing fluid (e.g., ink, etc.) on media (e.g., paper plastic, etc.). The system 832 can be utilized to prepare print media for a finishing process performed by a finisher 834 comprising the print shoe 800. In some examples, the printer 828 can prepare print media and send it to a conditioner 830, which can sends print media to the finisher 834 comprising the print shoe 800 to undergo the finishing process. In some examples, the print media can be prepared by the conditioner 830 for the finishing process performed by the finisher 834 comprising the print shoe 800. In some examples, the print media can be prepared by the printer 828 for the finishing process performed by the finisher 834 comprising the print shoe 800.

The foregoing description of various examples has been presented for purposes of illustration and description. The foregoing description is not intended to be exhaustive or limiting to the examples disclosed, and modifications and variations are possible in light of the above teachings or may be acquired from practice of carious examples. The examples discussed herein were chosen and described in order to explain the principles and the nature of various examples of the disclosure and its practical application to enable one skilled in the art to utilize the disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Since many examples can be made without departing from the spirit and scope of the system and method of the disclosure, this specification merely sets forth some of the many possible examples configurations and implementations.

What is claimed:

1. A print shoe, comprising:
    a spring;
    a body including a first surface;
    a first arm extending from a portion of the first surface and including a first mounting mechanism to couple to the spring; and a second arm extending from a different portion of the first surface in a position substantially coplanar with the first arm, wherein the first mounting mechanism is located on a face of the first arm that is closest to the second arm, and wherein the second arm includes a second mounting mechanism located on a face of the second arm that is closest to the first arm to couple to the spring and dispose the first arm a distance away from the second arm when coupled to the spring.

2. The print shoe of claim 1, further comprising a third arm extending from the first arm or the second arm in a direction towards the other of the first arm or the second arm to ensure at least a portion of a distance between the first arm and the second arm is maintained.

3. The print shoe of claim 2, wherein the third arm further comprises a curved portion.

4. The print shoe of claim 3, wherein the print shoe further comprises a fourth arm extending from the first arm or the second arm that is opposite the second arm or the first arm including the third arm.

5. The print shoe of claim 4,
wherein the fourth arm includes a curved portion to contact the curved portion of the third arm to ensure a distance between the first arm and the second arm does not exceed a threshold distance;
wherein the fourth arm includes a curved portion to contact the first arm or second arm, including the third arm, to ensure at least the portion of distance between the first arm and the second arm is maintained; and
wherein the third arm includes a curved portion to contact the second arm or first arm, including the fourth arm, to ensure at least the portion of distance between the first arm and the second arm is maintained.

6. The print shoe of claim 1, wherein the first mounting mechanism comprises a protrusion extending from the first arm toward the second arm, wherein the second mounting mechanism comprises a protrusion extending from the second arm toward the first arm.

7. The print shoe of claim 1, wherein the first mounting mechanism are positioned substantially at a distal end of the first arm, and wherein the second mounting mechanism is positioned substantially at a distal end of the second arm.

8. A print shoe, comprising:
a body, further comprising a first surface, including:
a first arm extending from the first surface and including a first mounting mechanism to couple to a spring; and
a second arm extending from a translator and is parallel with the first arm, wherein the first mounting mechanism is located on a face of the first arm that is closest to the second arm, and wherein the second arm includes a second mounting mechanism located on a face of the second arm that is closest to the first arm to couple to the spring and dispose the first arm away from the second arm when coupled to the spring.

9. The print shoe of claim 8, wherein the translator is comprised of bearing material formed of a metal, a plastic, or combinations thereof.

10. The print shoe of claim 8, wherein the first mounting mechanism is positioned in the centermost portion of the first arm along the face of the first arm that is closest to the second arm, and wherein the second mounting mechanism is positioned in the centermost portion of the second arm along the face of the second arm that is closest to the first arm.

11. The print shoe of claim 8, further comprising a third arm extending from the first arm or the second arm in a direction towards the other of the first arm or the second arm to ensure at least a portion of the distance between the first arm and the second arm is maintained.

12. A system comprising:
a printer; and
a finisher coupled to the printer, wherein the finisher comprises a channel system, a translator coupled to the channel system, and a print shoe coupled to the translator, wherein the translator is to move the print shoe laterally along the channel system, wherein the print shoe further comprises a body including:
a first arm extending from a first surface and including a first mounting mechanism to couple to a spring; and
a second arm in a position substantially coplanar with the first arm, and wherein the second arm includes a second mounting mechanism to couple to the spring and dispose the first arm away from the second arm when coupled to the spring.

13. The system of claim 12, wherein the second arm extends from the first surface of the body or extends from the translator.

* * * * *